US00RE36567E

United States Patent [19]

Godbersen

[11] E Patent Number: Re. 36,567

[45] Reissued Date of Patent: Feb. 15, 2000

[54] PERSONAL WATERCRAFT TRAILER

[76] Inventor: Byron L. Godbersen, Lake LaJune Estates, Ida Grove, Iowa 51445

[21] Appl. No.: 08/700,022

[22] Filed: Aug. 20, 1996

Related U.S. Patent Documents

Reissue of:

[64] Patent No.: 5,518,261
Issued: May 21, 1996
Appl. No.: 08/337,312
Filed: Nov. 10, 1994

U.S. Applications:

[63] Continuation of application No. 08/164,349, Dec. 9, 1993, abandoned, which is a continuation of application No. 08/006,479, Jan. 21, 1993, abandoned.

[30] Foreign Application Priority Data

Apr. 30, 1993 [CA] Canada ..... 27-01-93-7

[51] Int. Cl.[7] ..... B60P 3/10

[52] U.S. Cl. ..... 280/414.1; 280/63; 280/402

[58] Field of Search ..... 280/400, 401, 280/402, 404, 414.1, 460.1, 63, 414.3, 474, 476.1, 494, 500, 559, 467, 468, 583, 586

[56] References Cited

U.S. PATENT DOCUMENTS 4,078,821 3/1978 Kitterman .
4,519,738 5/1985 Wood .
4,529,217 7/1985 Wood .
4,779,888 10/1988 Raymond .
4,801,153 1/1989 Wilson .
5,016,896 5/1991 Shafer .
5,060,963 10/1991 Godbersen .

OTHER PUBLICATIONS

Copy—1 sheet brochure entitled "90 Personal Watercraft Trailers by Shoreland'R" by Midwest Industries, Inc.—1990.

Copy—Model 16–1600WV Boat Trailer by Load–Rite Trailers, Inc., Fairless Hills, Pennsylvania.

Copy—Model Double 1100/1300 KY/BW Boat Trailer by Midwest Industries, Inc., Ida Grove, Iowa.

Copy—Model Miss Ski–Tow II Boat Trailer by Triton Corporation, Hartford, Wisconsin.

*Primary Examiner*—Richard M. Camby
*Attorney, Agent, or Firm*—Henderson & Sturm

[57] ABSTRACT

A boat trailer having a wheel and axle supported frame including a pair of parallel, longitudinally extended frame portions interconnected at their rear ends, and with a longitudinally spaced pair of V-shaped bracket units mounted on each frame portion, each pair of bracket units supporting a pair of elongated, laterally spaced, parallel pair of bunks, each pair of bunks for supporting a single personal watercraft, and with an arcuate element secured to and extended forwardly from each frame portion and supporting at a forward end a winch unit.

10 Claims, 3 Drawing Sheets

PERSONAL WATERCRAFT TRAILER

Matter enclosed in heavy brackets [ ] appears in the original patent but forms no part of this reissue specification; matter printed in italics indicates the additions made by reissue.

This is a continuation or application Ser. No. 08/164,349 filed Dec. 9, 1993 now abandoned which is a continuation of Ser. No. 08/006,479 filed on Jan. 21, 1993 now abandoned.

TECHNICAL FIELD

The present invention relates to boat trailers in general, and in particular to a trailer for supporting a personal watercraft or the like pleasure boat.

BACKGROUND ART

Although the advent in the pleasure boat field of personal ski boats and the like brought a plethora of streamlined and stylish ski boats to satisfy those of all persuasions as to boat styles and sizes, the trailers for supporting and transporting this new personal phenomenon of the boating industry remained of the work horse type. Thus the contemporary trailers comprised a generally box-type frame with cross members supported by conventional brackets, either bunk or roller units, and with one or more vertically upright posts on the tongue or interior frame members for supporting winches. Although these ski boat trailers were functional, they were certainly susceptible to structural and design improvements to bring them at least even with the innovations of that which they carried, the personal watercraft.

DISCLOSURE OF THE INVENTION

The improved trailer includes a frame unit having portions extended parallel each other, a wheel and axle unit for supporting the frame unit, a cross member secured to and extended between the frame rear portions, a pair of V-shaped bracket units secured in longitudinally aligned, spaced relation on each frame portion, and a pair of transversely spaced elongated bunks for supporting a personal watercraft mounted in parallel relation on the bracket units. The improved trailer is enhanced by the provision of an elongated, arcuately curved element secured at one end to each frame portion, and having a bow stop and winch unit mounted on the other free end of the element.

It is an object of this invention to provide an improved trailer for supporting either a single or a pair of personal watercraft.

Yet another object of the invention is to provide a trailer for supporting either a single or pair of personal watercraft wherein the need for an intermediate cross member or intermediate longitudinal frame members is obviated.

Still another object for this invention is to provide a single or twin personal watercraft boat trailer having a simple, structurally sound design which is economical and effective in use.

BRIEF DESCRIPTION Of THE DRAWINGS

These and other attributes of the invention will become more clear upon making a thorough review and study of the following description of a preferred embodiment, particularly when reviewed in conjunction with the drawings, wherein.

BEST MODE FOR CARRYING OUT THE INVENTION

Figure 1:
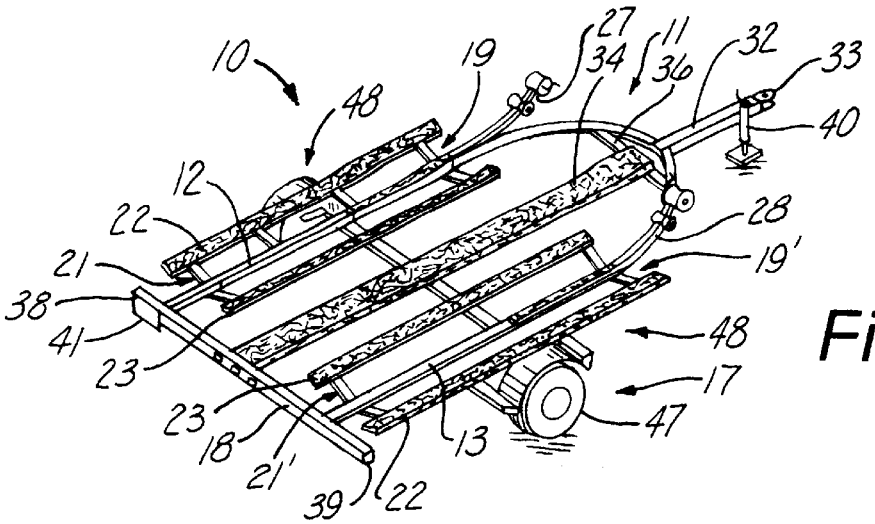
FIG. 1 is a perspective view of the boat trailer of this invention.
Figure 2:
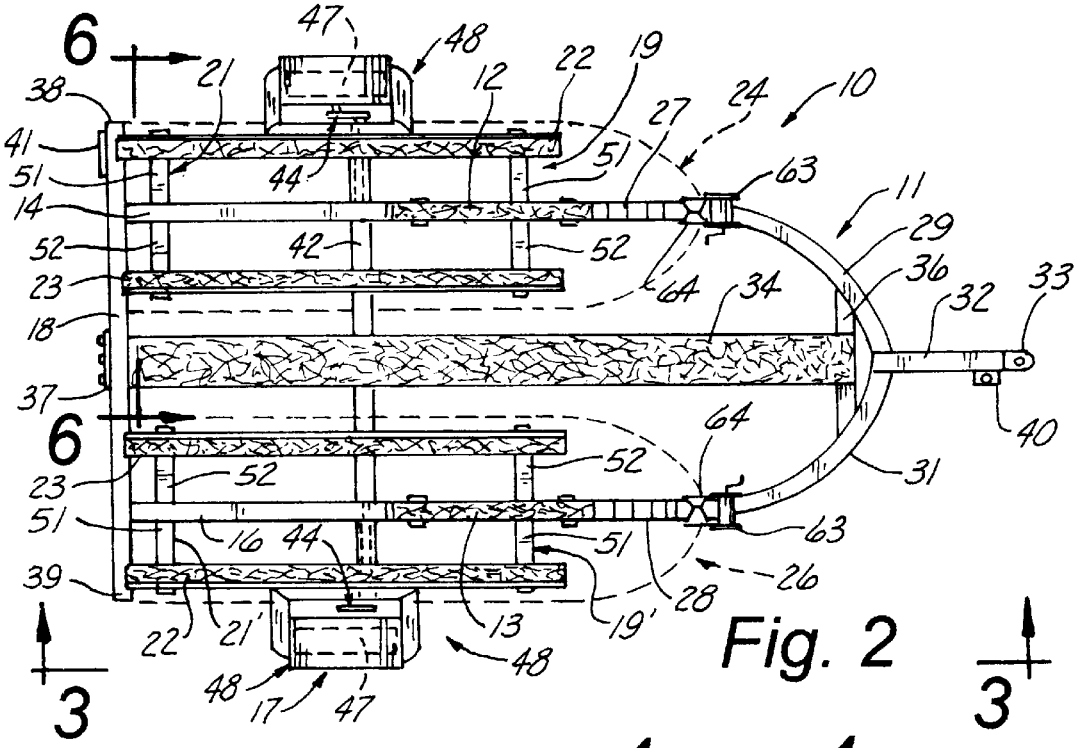
FIG. 2 is an enlarged plan view of the trailer of FIG. 1, with a pair of personal watercraft shown in dashed lines.

Referring now to the drawings, the boat trailer of this invention is illustrated generally at (10) and comprises a frame unit (11) (FIGS. 1 and 2) including a pair of laterally spaced frame portions (12), (13) having rear ends (14), (15); a wheel and axle unit (17) for supporting the frame unit (11); a cross member (18) secured to and extended between the frame portion rear ends (14), (16); a pair of V-shaped bracket units (19), (21) and (19'), (21') secured respectively to frame portions (12), (13); and a pair of bunk elements (22), (23) secured in parallel relationship to each of the bracket unit pairs (19), (21) and (19'), (21') for supporting a pair of personal watercrafts (24), (26) shown in phantom in FIG. 2. Optional winch post assemblies (27), (28) (FIGS. 1 and 3) are mounted respectively, forwardly on the frame portions (12), (13) for operator winch control of the positioning of each watercraft (24), (26).

More particularly, the frame unit (11) has an A-shape with forward elements (29), (31) (FIG. 2) of the frame portions (12), (13), respectively, converging to form a tongue unit (32) with a standard hitch (33) for connection to a prime mover (not shown) for transporting the trailer (10). An elongated walkboard (34) is provided, extended along the centerline of the trailer (10) between a mounting connection (36) to the front of the frame unit (11) and a mounting connection (37) on the cross member (18) at the rear of the frame unit (11). The frame portions (12), (13) are parallel each other and the walkboard (34), all three components disposed longitudinally of the trailer (10). The cross member (18) ties together the rear ends of the frame portions (12), (13) (FIG. 2), extended transversely of the frame unit (11) with outer ends (38), (39) for mounting reflective or lighted tail lights (not shown) and/or license plates (41) (FIG. 1). A jack stand (40) (FIG. 1) is provided at the tongue unit (32) for supporting the frame unit (11) as mounted on the wheel and axle unit (17) in a level condition.

Figure 3:
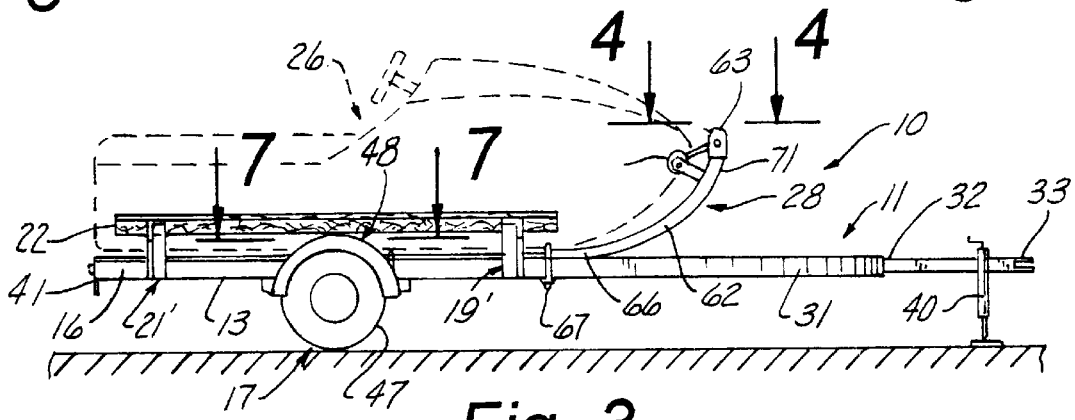
FIG. 3 is a side elevational view taken along the line 3—3 in FIG. 2.
Figure 4:
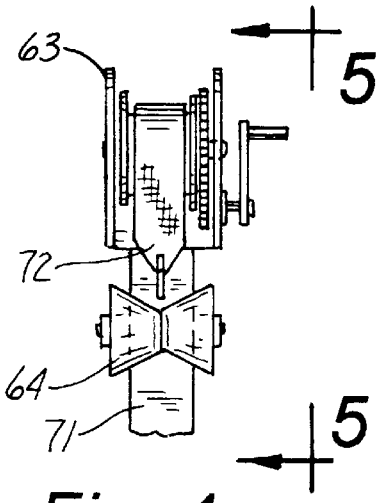
FIG. 4 is an enlarged, fragmentary view of the bow stop and winch unit taken along the line 4—4 in FIG. 3.
Figure 7:
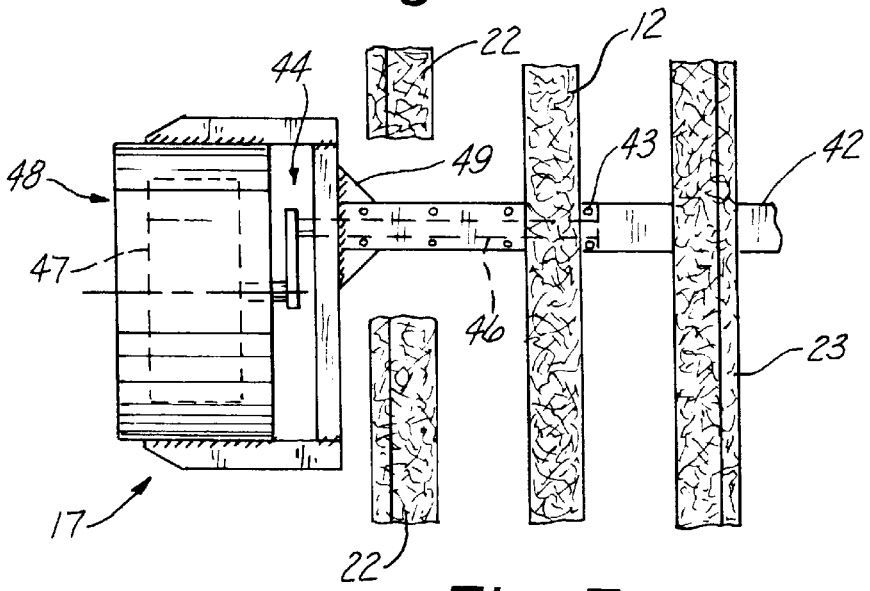
FIG. 7 is a fragmentary plan view taken along the line 7—7 in FIG. 3.

The wheel and axle unit (17) is conventional, comprising a transverse brace (42) (FIGS. 2 and 7) secured at (43) beneath each frame portion (12), (13) for support thereof at a location intermediate the length of the portions (12), (13) as best illustrated in FIGS. 2 and 3), and including a torsion axle device (44) (FIG. 7) secured at each outer end (46) of the brace (42) for flexibly supporting a wheel (47). A fender unit (48) for covering each wheel (47) is mounted by a bracket (49) to each brace outer end (46).

Figure 6:
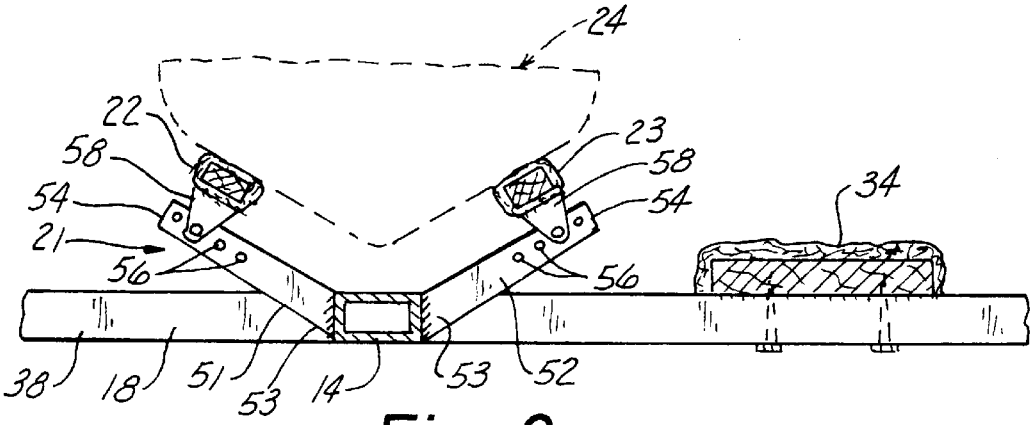
FIG. 6 is an end elevational view taken along the line 6—6 in FIG. 2.

To support the hunk elements (22), (23), each bracket unit (19), (21) and (19'), (21') is identical, and comprises a pair of wing members (51), (52) (FIG. 6), each wing member having an inner end (53) secured to a respective side of the frame portion (12) or (13), with the outer end (54) extended laterally outward and upwardly. A plurality of bolt holes (56) are formed in longitudinally spaced relation in each wing member outer end (54) for bunk adjustment purposes described hereinafter.

Thus, each frame portion (12), (13) carries a pair of identical bracket units (19), (21) and (19'), (21'), respectively, in longitudinally spaced and aligned relation. In this manner, laterally spaced pairs of bunk elements (22), (23) (FIGS. 2 and 6) are mounted in parallel relation in a nested manner on the outer ends (54) of the wing members (51), (52). Each bunk element (22), (23) has a mounting plate (58) (FIG. 6) secured thereto at each end for adjustable connection via the holes (56) to the wing member outer ends (54); and with the connections (59) pivotal to enable the bunk elements (22), (23) to pivot about a horizontal axis longitudinally of the trailer (10) to adjustably receive the hull (61) of the watercraft (24), (26) supported thereon.

Figure 5:
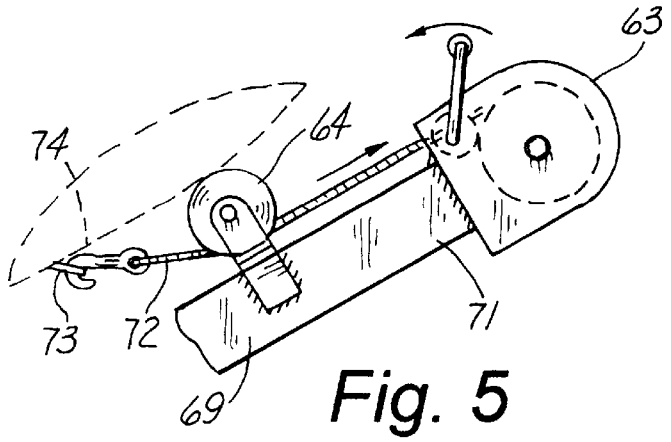
FIG. 5 is a side elevational view taken along the line 5—5 in FIG. 4.
Figure 8:
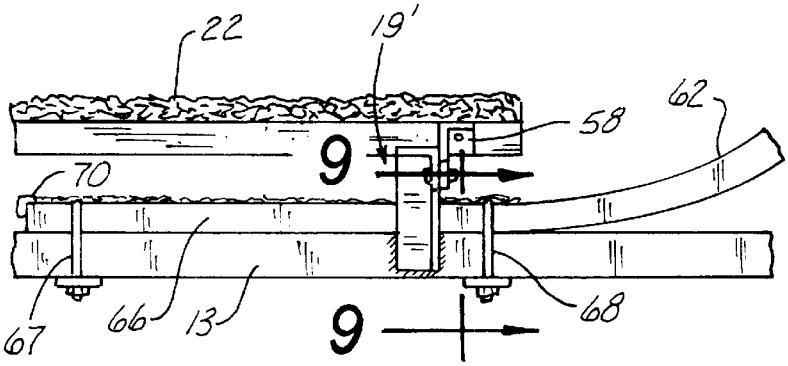
FIG. 8 is an enlarged detail view of FIG. 3.
Figure 9:
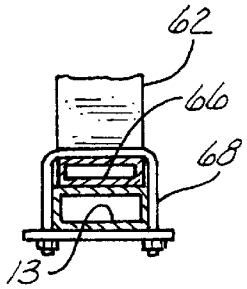
FIG. 9 is a vertical sectional view taken along the line 9—9 in FIG. 8.
Figure 10:
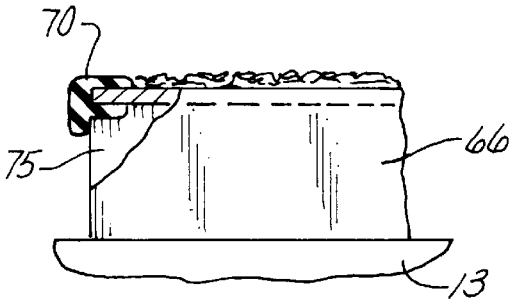
FIG. 10 is an enlarged detail of FIG. 9.

The optional winch post assemblies (27), (28) are identical, each comprising an elongated element (62) (FIGS. 3 and 8), a winch device (63) (FIG. 5) and a bow stop (64). The element (62) has one end (66) substantially straight for mounting longitudinally with and on top of a forward part of each frame portion (12), (13), as by a pair of U-bolt fasteners (67), (68), and with an integral free end (69) curved upwardly in an arcuate manner as best illustrated in FIG. 3. A rubberized or like bumper (70) is affixed to the rear portion (75) of the end (66) for safety purposes.

By referring to FIG. 2, it will be noted that the element (62) is disposed in a vertical plane aligned longitudinally with at least a part of each frame portion (12), (13) and that each element (62) is also disposed laterally, centrally of each pair of bunk elements (22), (23), thus placing each winch device (63) mounted at the upper end (71) of each free end (69) at a location in front and centrally of the transportation position for each personal watercraft (24), (26). In this manner, with the winch strap (72) (FIG. 5) secured at (73) to a watercraft (24), (26), upon winching the watercraft forwardly upon its respective pair of bunk elements (22), (23), the bow (74) may be brought into engagement with the bow stop (64) secured to the free end (69) slightly rearwardly of the winch device (63).

By this arrangement, an improved trailer is provided for supporting either a single or a pair of personal watercraft. Each on a pair of bunk elements (22), (23) arranged in a nesting condition by a pair of V-shaped bracket units (19), (21) or (19'), (21'). A pair of watercraft, when mounted on the trailer (10) would be placed in a parallel, side-by-side condition symmetrically arranged for balance on either side of the trailer longitudinal centerline due to the symmetrical arrangement of the bracket units (19), (21) and (19'), (21'), and their bunk elements (22), (23) in relation to the trailer frame unit (11).

I claim:

[1. A personal watercraft trailer comprising:

a frame including a tongue unit at a forward end thereof;

a wheel and axle assembly supporting said frame;

first means mounted on said frame for supporting a first watercraft hull and having a forward end, said first means including a pair of laterally spaced bunk elements;

second means mounted on said frame in laterally spaced relation to said first means for supporting a second boat hull and having a forward end, said second means including another pair of laterally spaced bunk elements;

a first device mounted on, said frame and including a first elongated element having opposed ends, one said end disposed rearwardly of said forward end of said first means, and said opposite end disposed forwardly of said forward end of said first means, and including further means mounted on said opposite end for engaging the bow of the first watercraft supported on said first means;

a second device mounted on said frame in laterally spaced relation to said first device and including a second elongated element having opposed ends, one said end of said second elongated element disposed rearwardly of said forward end of said second means, and said opposite end of said second elongated element disposed forwardly of said forward end of said second means, and including further means mounted on said opposite end of said second elongated element for engaging the bow of the second watercraft supported on said second means.]

2. [The personal watercraft trailer of claim 1,] *A personal watercraft trailer comprising:*

*a frame including a tongue unit at a forward end thereof;*

*a wheel and axle assembly supporting said frame;*

*first means mounted on said frame for supporting a first watercraft hull and having a forward end, said first means including a pair of laterally spaced bunk elements;*

*second means mounted on said frame in laterally spaced relation to said first means for supporting a second boat hull and having a forward end, said second means including another pair of laterally spaced bunk elements;*

*a first device mounted on said frame and including a first elongated element having opposed ends, one said end disposed rearwardly of said forward end of said first means, and said opposite end disposed forwardly of said forward end of said first means, and including further means mounted on said opposite end for engaging the bow of the first watercraft supported on said first means;*

*a second device mounted on said frame in laterally spaced relation to said first device and including a second elongated element having opposed ends, one said end of said second elongated element disposed rearwardly of said forward end of said second means, and said opposite end of said second elongated element disposed forwardly of said forward end of said second means, and including further means mounted on said opposite end of said second elongated element for engaging the bow of the second watercraft supported on said second means,* and further including at least one device adjustably clamping each said first and second devices to said frame for providing fore and aft positioning of said devices relative to said frame.

3. The personal watercraft trailer of claim [1] *2*, and further wherein each said means mounted on said first and said second elongated element opposite ends comprises a bow stop.

4. The personal watercraft trailer of claim 3, and further wherein each said means mounted on said first and said second elongated element opposite ends, includes further a winch device for pulling a watercraft hull against a respective bow stop.

[5. A personal watercraft trailer comprising:

a frame including a pair of laterally spaced frame members, said frame members each having a rear end, a portion extended longitudinally of said frame and a forward element, said forward elements converging to form a tongue unit, said frame member portions extended parallel each other;

a wheel and axle assembly supporting said frame;

a cross member unit secured to and extended between said frame member rear ends;

a pair of bracket units secured in longitudinally spaced relation to each frame member portion;

a pair of boat hull engaging members mounted on said pair of bracket units for engaging the single hull of a boat support thereon;

an elongated element having one end secured to each frame member portion, and having further a free end disposed forwardly of said one end relative to said frame member, said element disposed in longitudinal alignment with said frame member portion to which it is secured; and a bow stop mounted on said element free end for abutment with the bow end of a boat supported on each pair of hull engaging members.]

6. [The personal watercraft trailer of claim 5,] *A personal watercraft trailer comprising:*

*a frame including a pair of laterally spaced frame members, said frame members each having a rear end, a portion extended longitudinally of said frame and a forward element, said forward elements converging to form a tongue unit, said frame member portions extended parallel each other;*

*a wheel and axle assembly supporting said frame;*

*a cross member unit secured to and extended between said frame member rear ends;*

*a pair of bracket units secured in longitudinally spaced relation to each frame member portion;*

*a pair of boat hull engaging members mounted on said pair of bracket units for engaging the single hull of a boat support thereon;*

*an elongated element having one end secured to each frame member portion, and having further a free end disposed forwardly of said one end relative to said frame member, said element disposed in longitudinal alignment with said frame member portion to which it is secured; and*

*a bow stop mounted on said element free end for abutment with the bow end of a boat supported on each pair of hull engaging members,* and further including at least one device adjustably clamping each element one end to a respective frame member portion for providing fore and aft positioning of said elements relative to each other.

7. [The personal watercraft trailer of claim 5,] *A personal watercraft trailer comprising:*

*a frame including a pair of laterally spaced frame members, said frame members each having a rear end, a portion extended longitudinally of said frame and a forward element, said forward elements converging to form a tongue unit, said frame member portions extended parallel each other;*

*a wheel and axle assembly supporting said frame;*

*a cross member unit secured to and extended between said frame member rear ends;*

*a pair of bracket units secured in longitudinally spaced relation to each frame member portion;*

*a pair of boat hull engaging members mounted on said pair of bracket units for engaging the single hull of a boat support thereon;*

*an elongated element having one end secured to each frame member portion, and having further a free end disposed forwardly of said one end relative to said frame member, said element disposed in longitudinal alignment with said frame member portion to which it is secured; and*

*a bow stop mounted on said element free end for abutment with the bow end of a boat supported on each pair of hull engaging members,* and further wherein each said bracket unit includes a pair of wing members having inner ends secured to a said frame member portion, with outer ends of said wing members extended laterally outwardly from said frame member to form a V-shape in rear elevation, each pair of said bracket units longitudinally aligned.

8. The personal watercraft trailer of claim 7, wherein said hull engaging members each comprises an elongated bunk pivotally mounted on a said bracket unit, with each bunk pivotally secured to longitudinally aligned outer wing member ends.

9. The personal watercraft trailer of claim 8, and further wherein each said longitudinally aligned pair of wing members movably supports a pair of parallel, transversely spaced bunks, whereby a pair of said transversely spaced bunks is disposed on each side of a centerline of said frame members for supporting a pair of personal watercraft.

10. The personal watercraft trailer of claim 7, with each said elongated element said one end substantially straight for mating engagement with a contiguous frame member portion, and with said free end curved forwardly and upwardly away from said one end, said clement disposed normally in a vertical plane.

11. The personal watercraft trailer of claim 10, including a winch means mounted on each said elongated element free end for pulling a bow of a boat supported on said frame against said bow stop.

[12. A personal watercraft trailer comprising:

a frame including a plurality of longitudinally disposed parallel frame members and including a tongue unit at a forward end thereof;

a wheel and axle assembly supporting said frame;

first means mounted on said frame for supporting a first watercraft hull, said first means including a pair of laterally spaced bunk elements;

second means mounted on said frame for supporting a second watercraft hull, said second means including a pair of laterally spaced bunk elements;

a first device including a first element attached to said frame and with a rear end of said first element disposed rearwardly of said forward end of said first means, and with a second element attached to said first element and extended upwardly therefrom for supporting a component for engaging the bow at the forward upper end of said first watercraft; and a second device including another first element attached to said frame and with a rear end of said another first element disposed rearwardly of said forward end of said second means, and with another second element attached to said another first element and extended upwardly therefrom for supporting a component for engaging the bow at the forward upper end of said second watercraft, said first element and said another first element disposed parallel to each other and extended longitudinally of said frame.]

[13. A personal watercraft trailer comprising:

a frame including a tongue unit at a forward end thereof;

a wheel and axle assembly supporting said frame;

first means mounted on said frame for supporting a first watercraft hull, said first means including a pair of laterally spaced bunk elements;

second means mounted on said frame for supporting a second watercraft hull, said second means including a pair of laterally spaced bunk elements;

a first device and a second device each for engaging the bow at the forward upper end of said first and second watercraft, respectively, said first and second devices mounted in laterally spaced relation on said frame, each said first and second devices comprising a first elongated member secured to said frame, a second elongated member attached to said first member and extended upwardly therefrom and having an upper end, and a bow engaging component attached to said upper end, said first members of said first and second devices extended parallel to each other and to the longitudinal axis of said frame.]

14. [The] *A* personal watercraft trailer [of claim 13,] *comprising:*

*a frame including a tongue unit at a forward end thereof;*

*a wheel and axle assembly supporting said frame;*

*first means mounted on said frame for supporting a first watercraft hull, said first means including a pair of laterally spaced bunk elements;*

*second means mounted on said frame for supporting a second watercraft hull, said second means including a pair of laterally spaced bunk elements;*

*a first element and a second element each for engaging the bow at the forward upper end of said first and second watercraft, respectively, said first and second elements mounted in laterally spaced relation on said frame, each said first and second elements comprising a first elongated end secured to said frame, a second elongated end extended upwardly therefrom, and a bow engaging component attached to said second elongated end, said first elongated ends of said first and second elements extended parallel to each other and to the longitudinal axis of said frame,* and further wherein at least one of said [members] *ends* is movable fore and aft relative to said frame for adjustably positioning each said bow engaging component.

* * * * *